Dec. 25, 1945.   W. T. REID   2,391,514
WING STRUCTURE FOR AIRPLANES
Filed Oct. 4, 1943
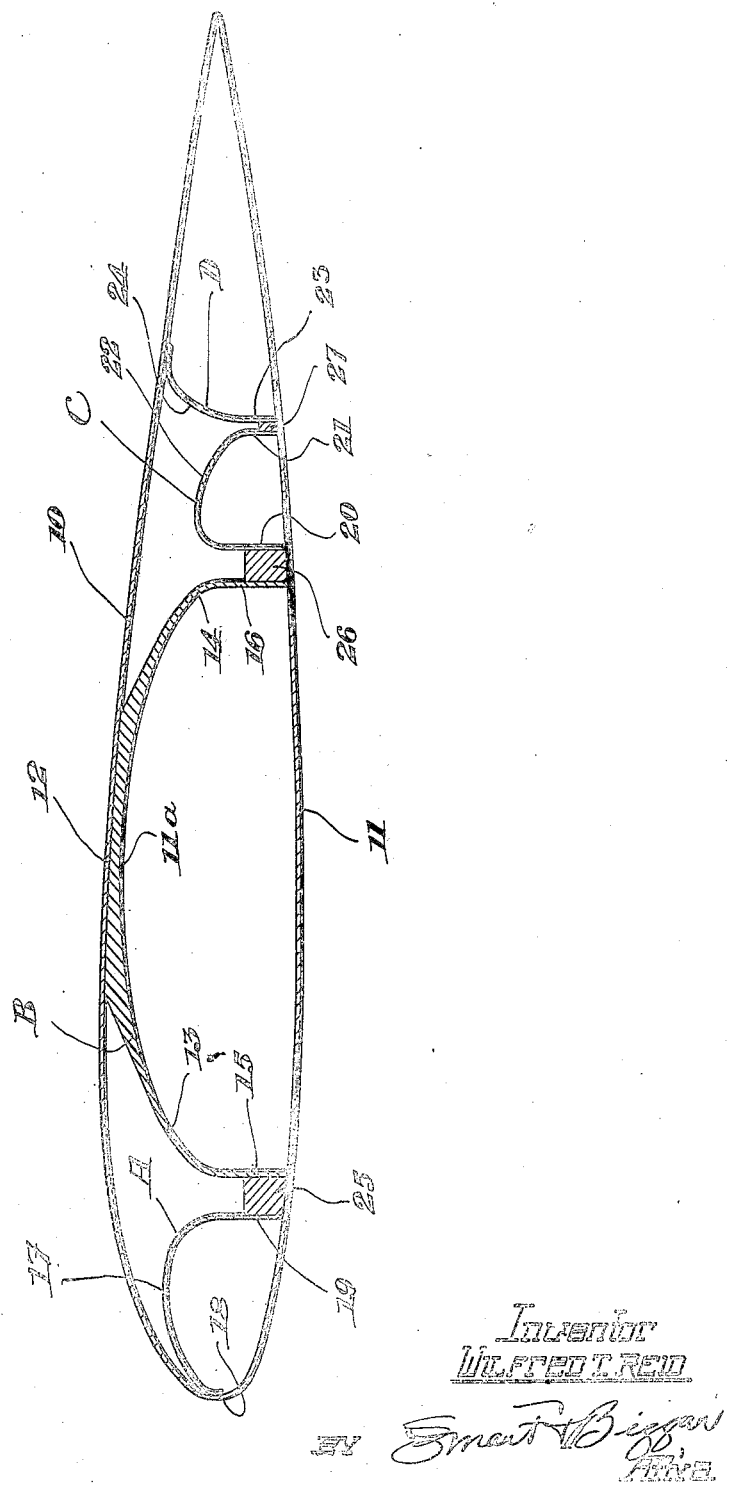
Inventor
WILFRED T. REID Patented Dec. 25, 1945

2,391,514

UNITED STATES PATENT OFFICE 2,391,514

WING STRUCTURE FOR AIRPLANES

Wilfred Thomas Reid, Mount Royal, Quebec, Canada, assignor to The Honorary Advisory Council for Scientific and Industrial Research, Ottawa, Ontario, Canada, a corporation of Canada Application October 4, 1943, Serial No. 504,936

4 Claims. (Cl. 244—123)

This invention relates to improvements in wing structures for airplanes and the objects of the invention are to provide a readily manufactured structure with large internal spaces for transport and other purposes accessible by the removal of non-stress-carrying sections.

Wing structures for airplanes are already known in which the stressed surfaces are supported by an internal framing but such framing generally occupies the space within the interior of the wing in such a way that it is not available for storage.

According to the present invention a plurality of spanwise channel structures of inverted curved U-form are suitably arranged within the wing contour, the depending legs of the channel sections being suitably connected to form a rigid structure. The spaces within the inverted channels and the lower surface of the wing contour are available for the storage of fuel, armament, control mechanism and other purposes, all as hereinafter more fully set forth and described in the accompanying specification and drawing.

In the drawing, the single figure shows a sectional elevation of a wing structure embodying the present invention.

Referring to the drawing 10 indicates the upper and 11 the lower wing surface or skin A, B, C and D represent a plurality of spanwise structural units located within the wing surfaces of which the units A, B and C are of inverted U-shape with depending legs and unit D is of angular form. As appears from the accompanying drawing "spanwise" means lengthwise of the wing so that a cross-section of the wing shows the channel members in cross-section.

It is to be understood that the number of channel members incorporated is not restricted to that shown and may be modified to suit strength and other requirements.

Adjacent dependent legs of units A, B, C and D are connected at their lower ends either directly or to spacing pieces 25, 26 and 27 in accordance with the exigencies of strength requirements.

The upper skin 10, the lower skin 11 and the channel units may be conveniently of layers of wood adhesively plied and joined by methods well known in the art. It will be obvious, however, that the members may be formed of any other suitable material such as, for example, an aluminum or magnesium alloy.

The result of the structure defined is that the lower wing surface or skin carries substantially no load stress and can therefore be detachable in sections if desired for access to the interior of the wing.

In the embodiment illustrated the unit B, which is centrally located within the wing, is of greater thickness than the other units and extends a substantial distance on each side of the centre of the wing so that the space beneath it may be usefully used for the transport of material or for other purposes. The upper side 11a of the member B is increased in thickness and formed with a flattened or slightly curved portion 12 connected and conforming to the inner side of the upper surface of the wing. From this horizontal portion 11a the sides of the structural member B are formed with curved portions 13 and 14 which gradually merge into the vertical legs 15 and 16 which extend to the lower surface 11.

The member A in the embodiment illustrated is formed with an upper curved portion 17 which is bent over until it is substantially tangential with the nose 18 of the wing to which it is secured. On the opposite side a leg 19 is formed extending substantially vertically.

The member C is formed with two vertical legs 20 and 21 connected by a curved upper portion 22, the leg 20 on the forward side being of greater height than the leg 21 on the rearward side of the member.

The member D is similar in form to the member A and has a vertical leg 23 merging into a curved portion 24 which is bent over until it is substantially tangential to the upper wing surface 10 to which it is secured.

When the channel unit is formed by bending plywood with a curved upper portion it will be found that the channel has considerable rigidity and the further advantage that it may be reinforced by additional plies at places of concentrated stress such as at the nose and around the openings, etc. When several channel sections of this type are connected together and to the wing surfaces a very rigid overall structure is produced.

What I claim as my invention is:

1. A wing structure for airplanes including upper and lower wing skins and interior structural supporting means therefor, said supporting means comprising a main elongated channel member extending spanwise of the wing, said member being of a width in cross-section which is a substantial proportion of the corresponding cross-sectional width of the wing and at least one smaller elongated channel member extending spanwise of the wing, such channel members being substantially inverted-U-shaped in cross-section with the base of the U forming a continuous curve merging into depending leg portions, and such channel members being connected through the leg portions, the latter being connected to the lower wing skin and the curved portion of at least the main channel member being connected to the upper wing skin.

2. A wing structure for airplanes including upper and lower wing skins and interior structural supporting means therefor, said supporting means comprising a main elongated channel member of a width in cross-section which is a substantial proportion of the corresponding cross-sectional width of the wing, and at least one smaller elongated channel member, each of the channel members extending spanwise of the wing and being substantially inverted-U-shaped in cross-section with the base of the U forming a continuous curve merging into depending leg portions, and such channel members being connected through the leg portions, the latter being connected to the lower wing skin and the curved portion of at least the main channel member being connected to the upper wing skin, and elongated curved members connected one to the rearmost channel member leg and the other to the foremost leg, the former being connected tangentially to the upper wing skin and the latter tangentially to the leading edge of the wing.

3. In a wing structure of the character described, upper and lower wing skins and interior supporting means therefor united into a rigid structure, said supporting means comprising a main elongated channel member extending spanwise of the wing, such member being of a width in cross-section which is a substantial proportion of the corresponding cross-sectional width of the wing, at least one smaller elongated channel member extending spanwise of the wing, such channel members being substantially inverted-U-shaped in cross-section with the base of the U forming a continuous curve merging into depending leg portions, and spacer means extending spanwise of the wing between leg portions of adjacent channel members, said spacer means being connected to such leg portions and to the lower wing skin and the curved portion of the main channel member being connected to the upper wing skin.

4. A wing structure as defined in claim 3, comprising spacer means connected to the rearmost channel member leg and to the lower wing skin, an elongated curved member connected to such spacer means and connected tangentially to the upper wing skin, spacer means connected to the foremost channel member leg and to the lower wing skin and an elongated curved member connected to the last mentioned spacer means and connected tangentially to the leading edge of the wing.

WILFRED THOMAS REID.